May 15, 1928.  
P. J. SHOUVLIN  
OIL WELL GEARING  
Filed April 19, 1927  
1,670,168  
2 Sheets-Sheet 1

INVENTOR  
Patrick J. Shouvlin  
By Toulmin & Toulmin,  
ATTORNEY

May 15, 1928.  1,670,168
P. J. SHOUVLIN
OIL WELL GEARING
Filed April 19, 1927   2 Sheets-Sheet 2

INVENTOR
Patrick J. Shouvlin
BY Toulmin Toulmin,
ATTORNEY

Patented May 15, 1928.

1,670,168

UNITED STATES PATENT OFFICE.

PATRICK J. SHOUVLIN, OF SPRINGFIELD, OHIO.

OIL-WELL GEARING.

Application filed April 19, 1927. Serial No. 185,014.

My invention relates to oil well gearing. It is the object of my invention to provide gearing which will be adaptable for use with a constant speed, single direction internal combustion engine from which it will be possible to secure the movement of one speed in one direction for drilling, and a dual speed movement in the other direction for tool withdrawal and the like without changing the direction or speed of the engine, or losing its horsepower.

Heretofore, it has been necessary to slow down the internal combustion engine to such a point that it has been very difficult to secure its horsepower output because of its necessary slow speed in starting the equipment out of the well, and it is also difficult to use the same equipment for drilling as for tool removal.

These difficulties arise in connection with the inherent characteristics of an internal combustion engine and it is my object to provide mechanism which will permit the engine to operate at its full rate of horsepower and mechanism which will be able to utilize such horsepower effectively.

Figure 1:
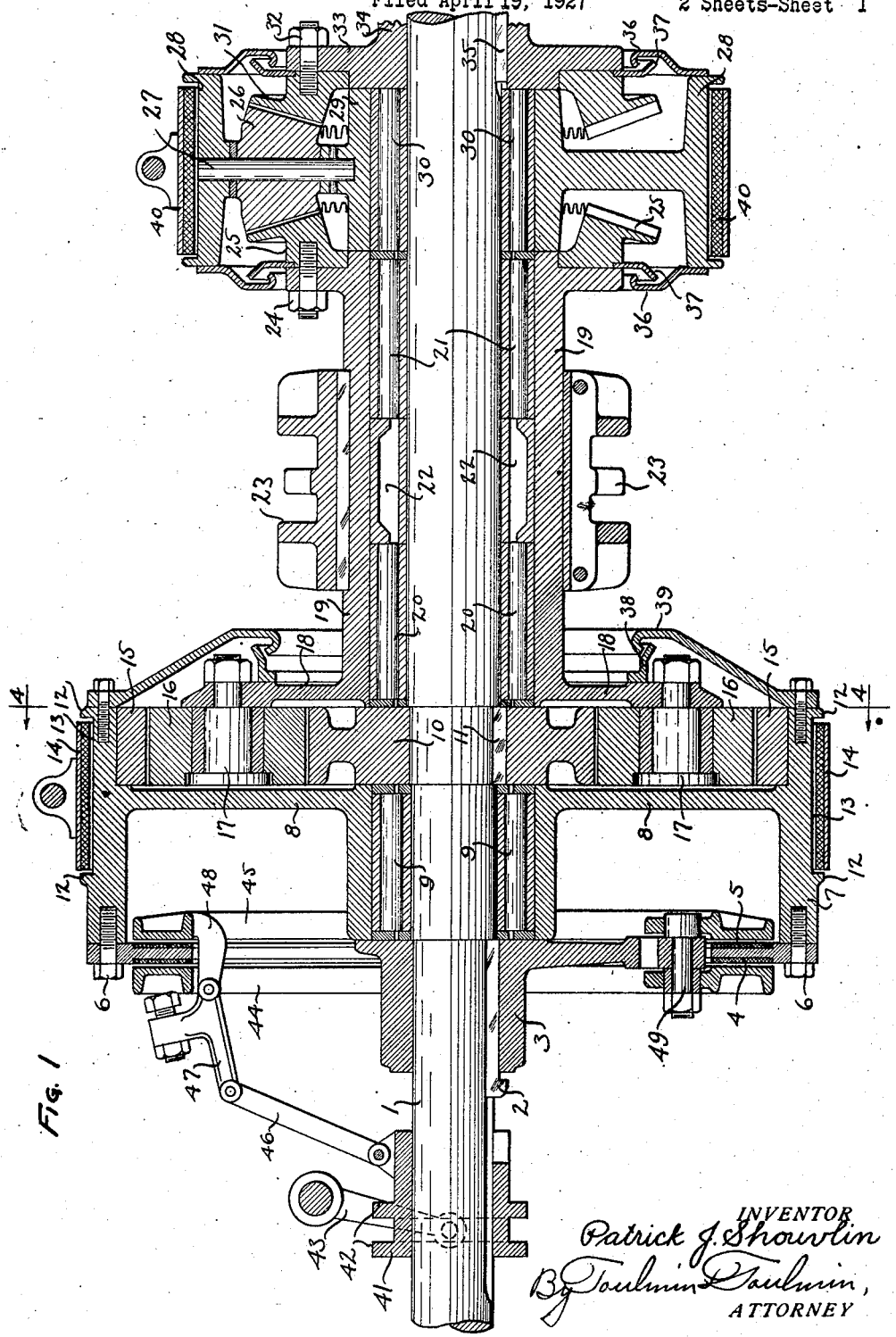
Figure 1 is a section through the mechanism of my invention.
Figure 2:
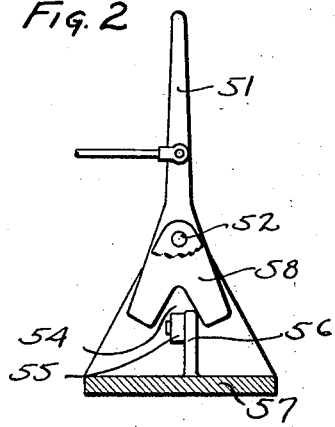
Figure 2 is a side elevation of a part of the lever control mechanism.
Figure 3:
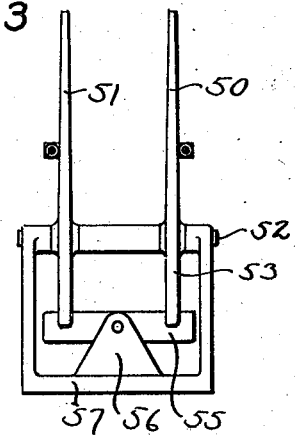
Figure 3 is a front elevation thereof.
Figure 4:
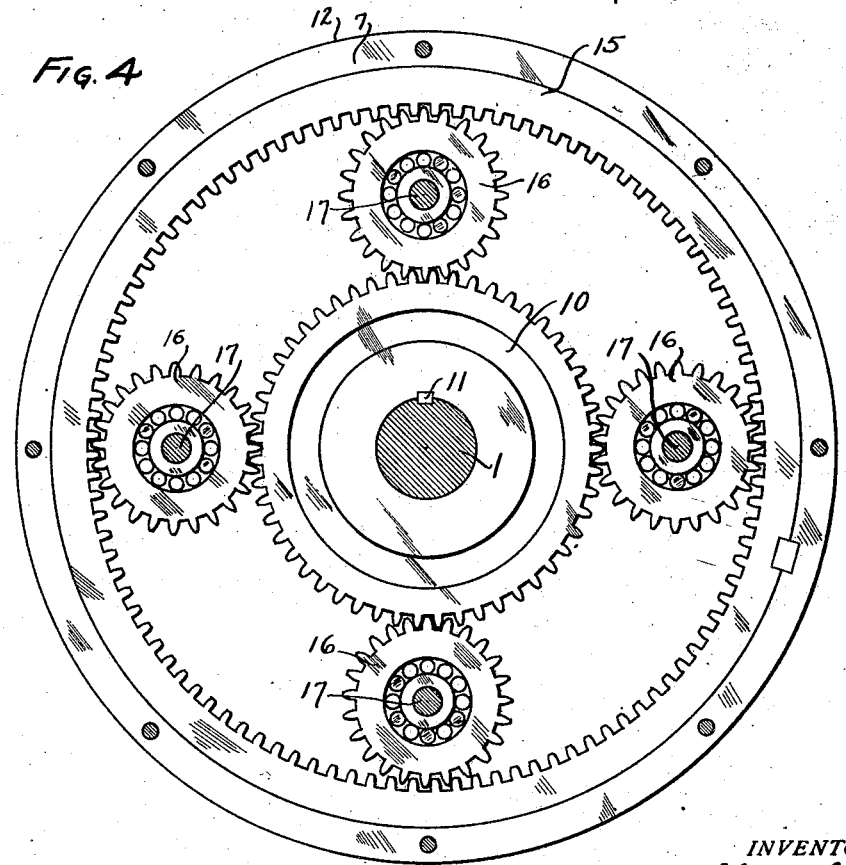
Figure 4 is a section on the line 4—4 of Figure 1.

Referring to the drawings in detail, 1 is a driven engine shaft, which carries keyed thereto by a key 2 the clutch spider 3, which is provided with the clutch faces 44 and 45. A ring provided with clutch faces 4 and 5 is bolted by the bolts 6 to a drum 7 loosely mounted through the agency of the web 8 and the sleeve 7 upon the roller bearings 9 carried on the shaft 1 between the spider 3 and a gear 10 fastened by the key 11 on the shaft 1. This drum is provided with a cutaway portion between the shoulders 12 forming a brake band face 13. This brake band face is engaged by the brake band 14.

On the inner side of the drum 7 to one side of the web 8 is fastened an annular, internally-toothed gear 15 which is adapted to mesh with the pinions 16 which are pivotally mounted on the pinion stud shafts 17 which are mounted at intervals loosely in the ring 18, such ring being carried upon a relatively long sleeve 19 which in turn is supported upon the roller bearings 20 and 21 on the shaft 1. These bearings are spaced by the collar 22 carried internally on the sleeve 19.

The sleeve 19 carries a sprocket 23 which in turn drives a chain that operates the driven mechanism, such as the oil well equipment hereinafter described. It is obvious that a face for receiving a belt may be provided instead of a sprocket.

This sleeve 19 carries on one end thereof through the agency of the bolts 24 a beveled gear 25 which is adapted to mesh with a plurality of beveled pinions 26 loosely turning upon a shaft 27. This shaft 27 is supported at one end in the brake drum 28 and at the other end in a sleeve 29 rotatably supported upon the shaft 1 by the roller bearing 30. The pinions 26 also mesh with an annular beveled gear 31 fixed by the bolts 32 to an annular member 33 mounted on the sleeve 34 which is keyed by the key 35 to the shaft 1. Suitable guards 36 and 37 are provided to protect the gears and to protect the operator from becoming caught in the gears. Similar guards 38 and 39 are provided for protecting the gearing 15, 16 and 10.

The drum 28 has mounted thereon a brake band 40, the operation of which will be hereinafter described.

The reciprocating loosely mounted sleeve 41 provided with a pair of annular shoulders 42 is adapted to be engaged by a yoke 43, which shifts it inwardly and outwardly to control the clutch members 44 and 45 through the agency of the links 46 and 47 and the arm 48. The bolts 49 serve as guide bolts and are supported by the web or spider 3.

The shaft 50 controls the forward speed mechanism. It is mounted upon a transverse pivotal support 52. It carries a segment 53 having a notch 54 for receiving the locking arm 55 pivotally mounted at 56 on the supporting base 57. The reverse lever 51 is mounted on the support 52 and is likewise locked by the locking lever 55 engaging with a notch in its segment 58. When the levers 51 and 50 are in vertical position they are both in neutral, but they are so arranged in connection with their segments 53 and 58 that when one is moved in operative position the other is locked in neutral or inoperative position.

The principal advantage of a mechanism of this character is that it makes it possible to utilize an internal combustion engine operating at a uniform speed in the same direction for both the drilling of wells and for the withdrawal of articles from the well, such as the tools and rods.

The drilling of the well is carried out at a certain predetermined speed, but it may become necessary to lift the tools from the well and this necessitates a relatively slow powerful pull at the beginning of the upward movement until the tools can be gotten under way and then the application of a very much more rapid movement after the inertia of the tools has been overcome. This is difficult to accomplish with an internal combustion engine.

Again, in lowering the tools into the well, the weight thereof should be controlled, which is possible by the braking action on the brake band.

It will be understood that the drilling and lowering operations are carried out by the reverse mechanism while the tool elevating operation is carried out by the forward speed mechanism.

My idea is a novel one in oil well practice of utilizing this multiple speed mechanism in oil well drilling utilizing one speed in drilling and two speeds for withdrawal of the tools and other equipment.

*Method of operation.*

Assuming that the shaft 1 is turning clockwise, and the parts are in neutral position, it will be found that both brake bands 14 and 40 are loose on their drums 7 and 28 and the clutch consisting of the clutch plates 44 and 45 and the clutch faces 4 and 5 will be declutched.

The lever 50 is moved from neutral position to one-half speed position. In this position, the go-ahead forward movement brake band 14 and brake drum 7 respectively are engaged while the clutch is loose. At the same time, the brake band 40 is loose on the brake drum 28. This causes the brake drum 7 to become stationary while the shaft 1 is turning the gear 10 so that the intermediate pinion 16 causes the sleeve 19 to turn at one-half speed.

If the lever 50 is moved to position, its full speed position, then the brake drum 7 is released by its brake band 14 and the clutch surfaces 4 and 5 are engaged by the clutch plates 44 and 45 by the movement of the sleeve 41, with the result that the drum 7 is picked up and revolves through the spider 3 with the shaft 1. The ring gear 15 travels, of course, with the drum 7 and the gear 10 travels with the shaft 1. As the speed of all the parts is the same, the pinions 16 are not revolved but the shift 1, spider 3, drum 7, ring gear 15, pinion 16 and gear 10 travel as a unit carrying with them the plate 18 and sleeve 19, together with the sprocket 23 at the same speed that the shaft 1 turns, or full speed forward.

In case it is desired to reverse the mechanism, the brake band 14 is loose, the clutch is loose, the lever 50 is brought to neutral and the member 51 which controls the brake band 40 is moved to cause the brake band 40 to engage the brake drum 28 which is thereby held stationary.

The shaft turns the plate member 33 together with its beveled gear 31 rotating the pinions 26 which in turn cause the beveled gear 25 to rotate in the reverse direction to the direction of movement of the shaft 1, and as the beveled gear 25 is connected to the sleeve 19, the sprocket 23 attached thereto is caused to turn in the reverse direction.

It will be understood that I desire to comprehend within my invention such modifications as may be necessary to adapt it to varying conditions and uses.

Having thus fully described my invention, what I claim as new and desire to secure by Letters Patent, is:—

In combination, a driving shaft, a sleeve loosely mounted thereon, bearings supporting said sleeve on said shaft spaced by said sleeve, a ring on said sleeve, a plurality of pinions pivotally mounted on said ring at spaced intervals with their axis parallel to the axis of the shaft, a gear mounted on said shaft within said pinions, a ring gear meshing with said pinions on the exterior thereof, a clutch drum engaging said ring gear having a drum face on the exterior thereof, a clutch band for engaging said drum, clutch surfaces mounted on a ring on said drum, a spider fixed on said shaft, clutch members adapted to engage said surfaces carried by said spider, and means carried on said shaft for engaging and disengaging said clutch members with said clutch surfaces, and bearing means for supporting said drum on said shaft, said bearing means being located between the gearing on said shaft and the spider on said shaft, means to interconnect said clutch and band whereby said clutch and band may be operated alternately, and a common operating means therefor.

In testimony whereof, I affix my signature.

PATRICK J. SHOUVLIN.